United States Patent [19]

McKinley

[11] 4,425,192

[45] Jan. 10, 1984

[54] METHOD OF FORMING BATTERY ELECTRODES

[75] Inventor: Larry F. McKinley, Atlanta, Ga.

[73] Assignee: Allied Corporation, Morristown, N.J.

[21] Appl. No.: 504,595

[22] Filed: Jun. 17, 1983

Related U.S. Application Data

[63] Continuation of Ser. No. 447,589, Dec. 7, 1982, abandoned.

[51] Int. Cl.³ .................... H01M 4/04; H01M 10/44
[52] U.S. Cl. ........................................ 204/2.1; 204/228
[58] Field of Search ................................ 204/2.1, 228

[56] References Cited

U.S. PATENT DOCUMENTS

| | | | |
|---|---|---|---|
| 4,046,642 | 9/1977 | Edwards | 204/2.1 |
| 4,098,961 | 7/1978 | Sabatino | 429/48 |
| 4,117,387 | 9/1978 | Windisch et al. | 320/2 |
| 4,146,830 | 3/1979 | Foster | 320/23 |
| 4,242,179 | 12/1980 | Fritts | 204/2.1 |
| 4,270,080 | 5/1981 | Kostecki | 320/24 |
| 4,337,124 | 6/1982 | Maskalick | 204/2.1 |

Primary Examiner—T. M. Tufariello
Attorney, Agent, or Firm—James P. DeClercq

[57] ABSTRACT

A method for forming battery plates or electrodes produces a substantial reduction in the forming energy per gram of active material, by providing the plates or electrodes being formed with energy in the form of at least three, and preferably eight, constant-current steps, an intermediate step being a higher current level than steps which precede or follow it. A low constant current is provided at the beginning of formation, when plate resistivity appears to be high due to the resistivity of the raw material, a higher constant-current is provided when formation has begun and plate conductivity is high, and a lower constant-current is provided towards the end of formation, as plate or electrode potential builds towards full charge. The method and apparatus disclosed is used in the tank formation of positive and negative battery plates or electrodes for use in dry charged batteries having antimonial and calcium grid positive plates.

4 Claims, 4 Drawing Figures

METHOD OF FORMING BATTERY ELECTRODES

This application is a continuation of application Ser. No. 447,589 filed Dec. 7, 1982, now abandoned.

The instant application relates to the field of battery manufacturing. In particular, the instant application relates to a stepped constant current method of forming battery plates or electrodes.

BACKGROUND OF THE INVENTION

In conventional production of lead-acid battery plates or electrodes, a grid structure is provided, and coated with a paste of powdered lead and a mixture of various lead oxides, known as leady oxide. This leady oxide is mixed with sulfuric acid to form the paste which is applied to the plates or electrodes. The pasted plates or electrodes are then cured, to harden the paste, conventionally by exposing the plates to a source of moisture and carbon dioxide, which may be performed in a humidity chamber injected with carbon dioxide gas, or, more conventionally, by exposing wet plates or electrodes to atmospheric carbon dioxide.

After curing, the plates or electrodes are formed by placing them in an electrolyte solution, such as dilute sulfuric acid, and passing a current through them. This transforms the material of the positive and negative plates into sponge lead, for a negative plate or electrode, and lead dioxide, for a positive plate.

Conventionally, forming current is provided by a commercially-available rectifying power supply, which is inherently capable of producing a substantially constant voltage, and contains circuitry for providing a substantially constant current. It is well-known that the use of a constant voltage produces poor results, due to lack of control over the current, which is the measure of forming energy, as the characteristics of the plates or electrodes change during forming. Thus, otherwise conventional rectifying power supplies are provided with circuitry to convert their output to a constant current. In view of the benefits of the instant invention, it is believed that the use of this conventional constant-current method of forming battery plates or electrodes is not efficient in terms of use of energy, since the plates or electrodes being formed change in their ability to accept forming energy during the course of the forming process. The instant invention overcomes this and other difficulties of the conventional method of forming battery plates or electrodes.

SUMMARY OF THE INVENTION

In accordance with the invention, the rectifier or source of electrical current is controlled in a stepwise manner to provide at least three constant-current levels, an intermediate level being a higher current level than either a preceding current level or a succeeding current level, to produce a substantially-constant voltage across the battery plates or electrodes being formed, in contrast with the varying voltage produced with prior art processes. Any number of constant-current steps in excess of three may be provided. The invention has been implemented with five sequential constant-current steps, and with eight sequential constant-current steps, and has been found to produce well-formed battery plates or electrodes, with a lower energy requirement per unit of leady oxide paste, and to produce a savings in electrical energy input to the rectifiers in the range of 34 to 40 percent.

Thus, it is a primary objective of the invention to produce a well-formed battery plate or electrode with a substantially lower use of electrical energy for forming. It is a feature of the invention that forming current supplied to battery plates or electrodes being formed is varied in a stepwise manner, in at least three constant-current steps, an intermediate step having a current level which is higher than the current levels of prior or succeeding constant-current steps to maintain a substantially-constant voltage across the battery plates or electrodes being formed. It is an advantage of the invention that the forming energy required per unit of leady oxide paste is decreased, and that the total electrical energy required for forming a battery plate or electrode is substantially decreased.

Other objectives, features and advantages of the invention will become apparent from the detailed description which follows.

DETAILED DESCRIPTION OF THE INVENTION

Figure 1:
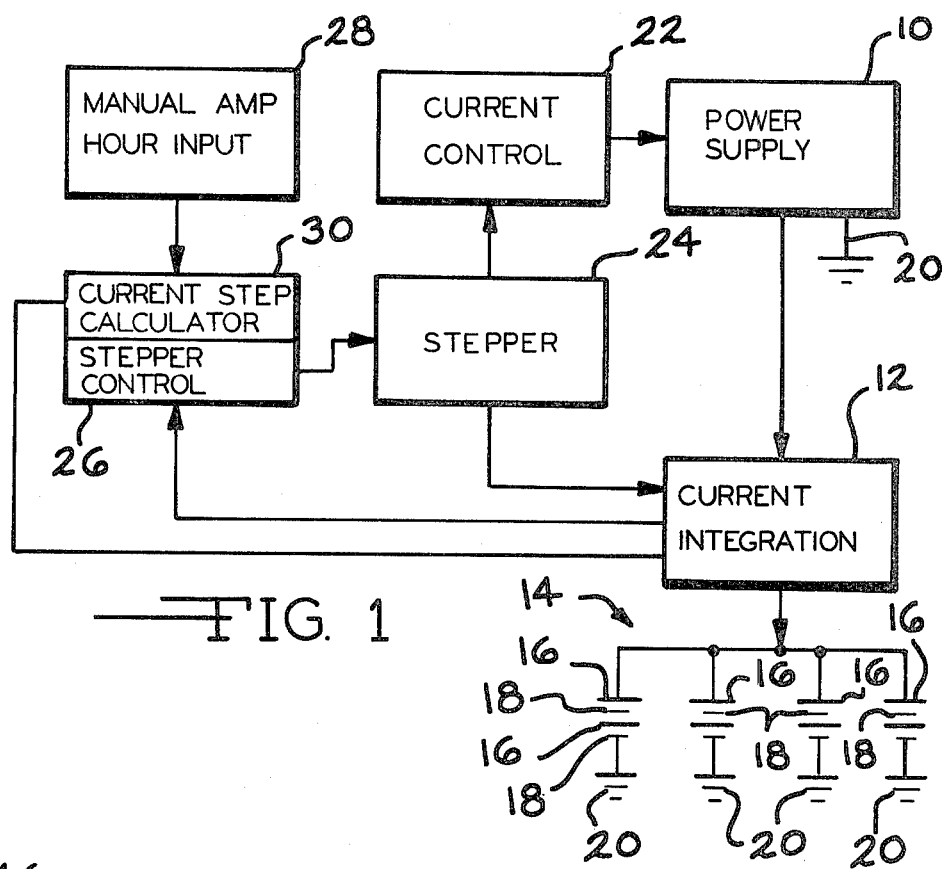
FIG. 1 is a block diagram of suitable apparatus for producing a battery plate or electrode in accordance with the invention.

It will become apparent, the apparatus shown in block-diagram form in FIG. 1 may be easily implemented by one skilled in the art, and may be implemented with various commercially-available devices to accomplish the benefits of the invention in accordance with the method of the invention. As will appear more fully below, there is no single preferred embodiment for constructing a circuit in accordance with the invention. A power supply means 10 is shown operably connected through current integration means 12 to a plurality of battery elements 14, shown as composed of positive plates or electrodes 16 and negative plates or electrodes 18. Battery elements 14 are immersed in a conventional electrolyte in conventional forming tanks, not shown for clarity. The circuit is completed through grounds 20, which are conventionally floating grounds for safety reasons, obtained by using conventional isolating transformers to supply power supply means 10. Current control means 22 is shown as operably connected to power supply 10. Power supply 10, as stated above, is conventionally provided with a control means for controlling its output current, for the specialized application of forming and charging batteries. The output current is conventionally adjusted by the rotation of a variable resistor, varying the voltage supplied to an internal current control circuit. Thus, it will be apparent that the current control means for practicing the invention may be a series of individually-selected fixed resistors, a digitally-controlled reference voltage, or preset adjustable resistors, for causing power supply 10 to supply a predetermined current upon selection of one of the resistors. A stepper means 24 is shown as operably connected to current control means 22, and, as will be apparent, is used to select one of the fixed resistors or preset variable resistors for controlling the output current of power supply 10. Stepper means 24 may be a conventional stepper switch, but is preferably a solid-state circuit such as in the form of a ring counter or flip-flop chain, which may be connected to current control means 22 in any of several conventional ways including the use of miniature reed relays connected to the outputs of the stepper means, and to the individual resistors of current control means 22. Similar devices may also be used to interconnect stepper means 24 and current integration means 12. As described in greater detail below, the forming of battery plates or electrodes according to the invention takes place in a plurality of current steps, each step having a predetermined current level and a predetermined forming energy, expressed in ampere hours. Current integration means 12 integrates the current being provided to battery elements 14 during a particular step, and signals the completion of that step. In this manner, formation of battery elements 14 may be interrupted, for even further savings of energy at peak-use periods, without harm to the formation process, since current integration means 12 will simply continue integrating when the flow of current resumes. Current integration means 12 may be a commercially-available integrator or a plurality of integrated circuit operational amplifiers provided with integrating capacitor feedback and appropriate scaling resistors or a voltage-controlled oscillator and counter. In one actual embodiment of the invention, an amplifier connected to a current measuring shunt is connected to a voltage-controlled oscillator. Pulses produced by the oscillator are digitally divided by a constant, to provide a chosen number of pulses per amp hour, which are applied to a counter to signal the completion of forming at a current level. The integrator or integrators may be enabled by stepper means 24 in any conventional manner, including the use of reed relays, or buffer gates. The output of an individual integrator of current integration means 12 may be connected to threshold means such as a Schmitt trigger or the like. These threshold means may be connected in parallel, and connected to stepper control means 26, or may be individually connected to stepper control means 26.

Manual ampere hour input 28 and current step calculator 30 may be implemented in various ways, including a general purpose computer, a special purpose computer, or a specialized logic function, according to the choice of one skilled in the art. Manual amp hour input 28 may thus be a keyboard, a row of toggle switches, or thumb wheel switches, in which an operator sets the total ampere hours required for formation of a particular grouping of battery elements 14.

Positive plates or electrodes 16 and negative plates or electrodes 18 require slightly different formation energy, so that various combinations of positive and negative electrodes may be selected. Since negative plates or electrodes require slightly less formation energy, it may be that two negative electrodes for a small battery are formed together with one positive electrode for a larger battery. When the desired forming energy has been entered in manual amp hour input means 28, current step calculator means 30 calculates the number of ampere hours in each step, in accordance with a predetermined percentage of formation energy to be supplied during each step, at a predetermined current level. Such a process is in the nature of a table lookup function, easily implemented in a general-purpose computer, and implemented with somewhat greater difficulty using discrete analog or digital means. If analog circuitry is desired, thumb wheel switches may be used for manual input means 28, and connected to a digital-to-analog resistive network for each digit, connected to a summing junction, and to appropriate scaling resistors to provide a reference value for threshold means of current integration means 12. If this approach is chosen, conventional comparators may be used instead of the Schmitt triggers.

After this calculation step, the process may begin with the current step calculator means initializing the stepper control means 26, to control stepper 24 to begin the first step. After a predetermined quantity of energy has been delivered to battery elements 14, current integration means 12 will detect the end of this first step, and send an appropriate signal to stepper control means 26, to begin the next step.

It will be apparent that the apparatus for implementing the invention may be constructed in numerous different manners. As will be apparent, current integration may be performed by a single integrator, with its scaling resistors and output comparator selected by a general purpose computer or the like, or by a number of integrators equivalent to the number of steps, with predetermined scaling resistors and Schmitt trigger or comparator output biases. The precise structure chosen by a particular artisan will, of course, differ from that chosen by another, although each will accomplish the function shown in applicant's FIG. 1.

Figure 2:
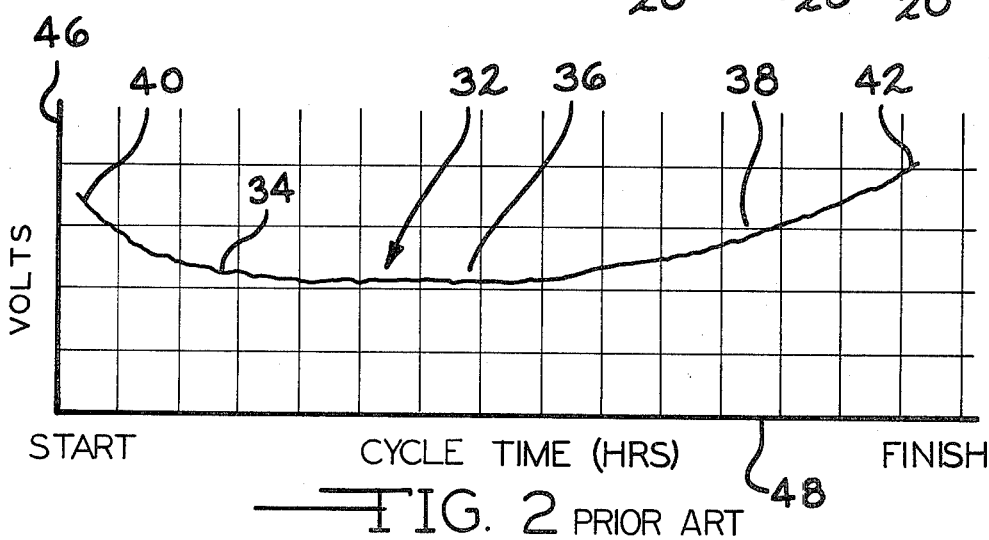
FIG. 2 is a diagram showing the approximate voltage versus time pattern found in a typical constant-current formation cycle.

Referring now to FIG. 2, there is shown a curve 32, showing a typical measured voltage applied to battery elements 14 when a constant forming current, as is conventional, is applied. In view of the benefits of the invention, it is now apparent that curve 32 has a first portion 34, a second portion 36 and a third portion 38. While the exact mechanism by which the benefits of the invention are realized is not known with precision, it appears that the high voltage at starting point 40 and during first portion 34 is due to the fact that insufficient material has yet been converted to active material, so that the resistance of the plate or electrode is high. During the second portion 36, it appears that sufficient material has been converted to active material to give the plate or electrode a low resistance, and good charge acceptance, since the formed areas serve as good conductors to the areas being formed. It further appears that the rising voltage during third portion 38 before ending point 42 is attained is due to the completion of forming and the resulting back voltage from the battery elements. In view of the benefits of the invention, it appears that energy is wasted due to high resistivity of the plate, there is more gassing and acid misting from the electrolyte baths, higher electrolyte temperatures in the last few hours of formation, and a longer cycle time due to the resistance shown in first portion 34 and third portion 38.

It may be noted that the disclosed process is preferably used in tank formation of positive and negative battery plates or electrodes for use in dry charge batteries having antimonial and calcium grid positive plates. The process and apparatus of the invention may be used with benefit to form plates or electrodes for other types of batteries, but the figures in the tables which follow may not apply, and may need redetermination as set forth below.

Figure 3:
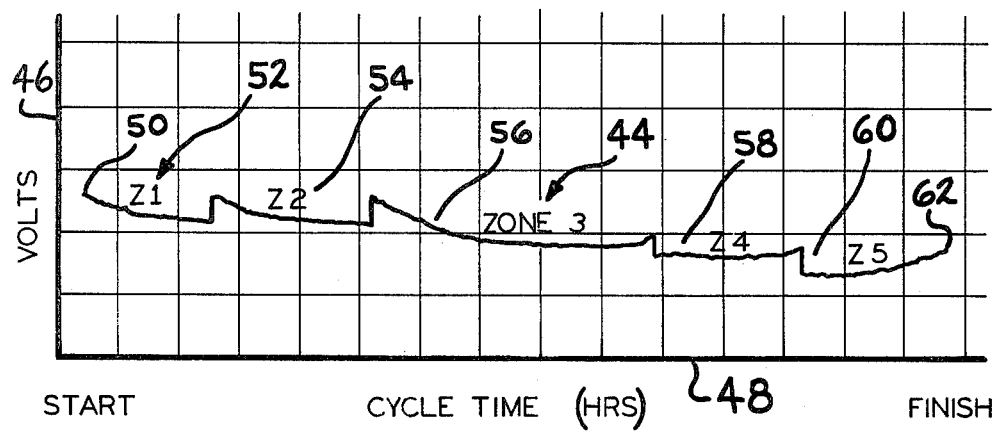
FIG. 3 is a diagram showing the voltage pattern found in accordance with a five-step constant-current formation method in accordance with the invention.

Turning now to FIG. 3, a curve 44 showing a five-step constant-current formation cycle according to the invention. As with FIG. 2, there is shown a vertical axis 46 for indicating the voltage measured as applied to battery elements 14, and a horizontal axis 48 showing the passage of time during a formation cycle. As shown, curve 44 shows an approximately-constant voltage, and has a starting point 50, a first step or zone 52, a second step or zone 54, a third step or zone 56, a fourth step or zone 58, a fifth step or zone 60, and an ending point 62.

FIG. 3 should be considered with Table I which follows.

TABLE I

| Step | Ampere Hour % | Current Amps | Ampere Hour Total AH |
|---|---|---|---|
| 1 | 4% | 200 A | 232 AH |
| 2 | 10% | 300 A | 580 AH |
| 3 | 70% | 450 A | 4060 AH |
| 4 | 10% | 300 A | 580 AH |
| 5 | 6% | 150 A | 348 AH |

As shown in FIG. 3 and Table I, the current applied in the sequential steps includes a 150 amp step and a 450 amp step, both producing approximately the same voltage.

Table I is based on a requirement of 5800 ampere hours for forming a particular combination of battery plates or electrodes. Thus, 70 percent of the total ampere hour requirements is applied during the third step or zone 56, in an amount of 4,060 ampere hours. The current levels during these five steps or zones is a function of the capacity of power supply means 10. The maximum output of the power supply used was about 450 amps. It is believed that a higher current may profitably be applied during the third zone 44, since it appears that most efficient formation is occurring at this time.

The ampere hour percentages shown in Table I were developed in an empirical manner. As is known, plates or electrodes are formed when, for instance, the white appearance of lead sulfate has been cleared from the surface of the plates or electrodes by the forming process. Thus, the formation process may be monitored visually. After selecting a current that gave an acceptable voltage value for a particular zone, beginning with the first zone 52, sample battery electrodes were formed at this current, and, at various intervals, plates or electrodes were removed to measure the percentage of active material which had been formed, and these plates or electrodes were built into batteries to determine the capacity of the plates or electrodes versus the ampere hours used in forming to that point. This process was continued to determine the parameters for the next and succeeding zones or steps. Thus, as can be seen, the figures shown in the tables may be easily determined by one skilled in the art by stepwise adjusting the current to produce a desired voltage level, forming plates or electrodes at this level for periods of time and performing laboratory analysis of the percentage of active material formed, and building batteries of the electrodes to determine charge capacity, with a view towards determining the greatest quantity of active material formed with the least forming energy.

This process may easily be performed in the normal production of lead-acid batteries, and involve tests normally performed in the course of quality control of a battery production facility.

Figure 4:
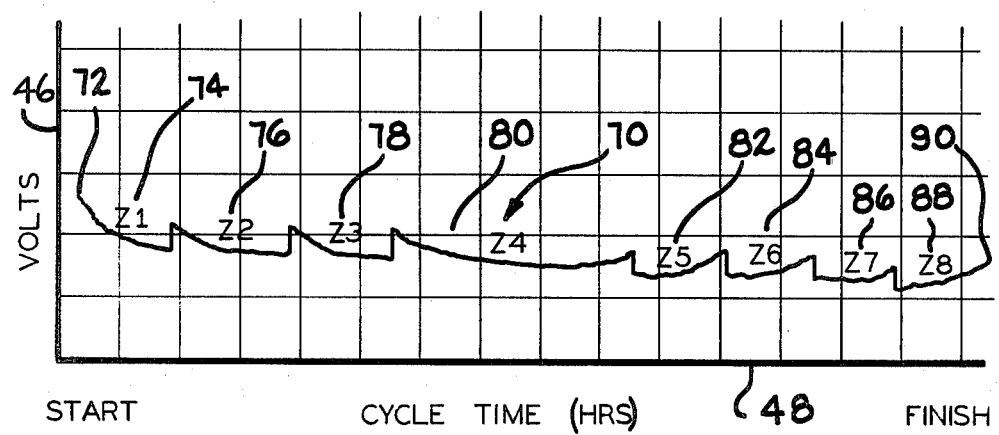
FIG. 4 is a diagram showing a voltage versus time pattern for an eight-step constant-current formation method in accordance with the invention.

FIG. 4 and Table II show an eight step constant-current process according to the invention. As shown in FIG. 4, curve 70 shows an approximately-constant voltage and has a starting position 72, a first step or zone 74, a second or zone 76, a third step or zone 78, a fourth step or zone 80, a fifth step or zone 82, a sixth step or zone 84, a seventh step or zone 86, an eighth step or zone 88 and an ending position 90. It will be apparent that as many steps as desired may be implemented. However, based on the advantages measured with the eight-step embodiment of the invention, it appears that the use of a larger number of steps, although producing a somewhat smoother voltage curve, will provide a relatively insignificant advantage. The data shown in Table II was developed in the same manner as the data shown in FIG. 1, assuming 5800 ampere hours required to form the plates or electrodes, and a rectifier or power supply means capable of an output of 450 amps, and, like Table I, Table II shows a process including three discrete sequential predetermined constant-current levels, an intermediate one of these levels being greater than the levels which precede and follow it.

TABLE II

| Step | Ampere Hours % | Current Amps | Ampere Hour Total AH |
|---|---|---|---|
| 1 | 3% | 150 A | 174 AH |
| 2 | 4% | 250 A | 232 AH |
| 3 | 7% | 350 A | 406 AH |
| 4 | 55% | 450 A | 3190 AH |
| 5 | 16% | 350 A | 928 AH |
| 6 | 8% | 300 A | 464 AH |
| 7 | 5% | 200 A | 290 AH |
| 8 | 2% | 100 A | 116 AH |

The details of the forming tanks and electrolyte solution are not shown, being conventional in the battery manufacturing industry. Also not shown is a step, not part of the invention, used when plates or electrodes to be formed are merely hung on hanger straps or supported on bars, for electrical connection, rather than being welded to the hanger straps. This mode of connection, known as "no burn", because of the lack of a welding step, requires an initial application of a low current in the reverse direction to insure proper contact between the plates or electrodes and the hanger or contact bars. This is a manual operation, and remains a manual operation, not part of the invention, and remains a manual operation in an actual installation of the invention. The reverse charge is then removed, and the circuit is discharged and allowed to stand idle for a period of time to allow dissipation of potential, and formation of lead sulfate. This also was, and is, a manual operation.

More efficient formation has led to a calculated reduction in the formation energy required per gram of active material. Use of the prior art process by use of a constant current, producing the voltage curve 32 of FIG. 2, required 0.357 ampere hours per gram for positive material and 0.330 ampere hours per gram of negative material. In the eight-step version of the invention, the ampere hour input values are calculated on the basis of 0.291 ampere hours per gram for positive material and 0.256 ampere hours per gram for negative material. This more efficient use of energy, in the order of a 20 percent increase, accounts for a large portion of the energy saved in forming battery plates or electrodes. In addition, it has been found that, in the eight-step process shown in FIG. 4 and Table II, any step or zone other than the first step or zone 74 may be interrupted for up to about seven and one-half hours without detrimental effect on the formation process. When power is restored, current integration means 12 causes the process to continue from the point at which it was interrupted.

Therefore, forming operations conducted in accordance with the invention may be switched on or off as part of a production facilities' power factor control program, to maintain voltage and current inphase to prevent the draw of excessive current from the incoming power line, thus presenting an opportunity for even further savings in energy costs and efficient use of energy resources.

As stated above, apparatus according to the invention may be implemented in many different ways, to accomplish the same result, and the process of the invention may be carried out with any desired number of steps, and numerous other modifications and variations of the invention will be apparent to one skilled in the art, and may be easily made without departure from the spirit and scope of the invention.

I claim:

1. A method of forming battery electrodes, comprising the steps of:
   placing said battery electrodes in an electrolyte solution;
   connecting said battery electrodes to a source of electrical current; and
   controlling said source of electrical current to provide said current for forming said battery electrodes in at least three discrete sequential predetermined constant-current levels, an intermediate one of said at least three discrete sequential predetermined constant-current levels being greater than a first predetermined constant-current level preceding said intermediate one of said at least three constant-current levels and being greater than a second predetermined constant-current levels following said intermediate one of said at least three constant-current levels, said second predetermined level being lesser than said first predetermined level, to provide an approximately-constant voltage across said battery electrodes.

2. A method of forming battery electrodes according to claim 1, wherein:
   said step of controlling said source of electrical current includes the step of controlling said current to provide five discrete sequential predetermined constant-current levels, a second one of said sequential predetermined constant-current levels being controlled to be a higher level than a first one of said levels, a third one of said levels being controlled to be a higher level than said second one of said levels, a fourth one of said levels being controlled to be a lower level than said third one of said levels, and a fifth one of said sequential predetermined constant-current levels being lower than the level of said fourth one of said sequential predetermined constant current levels and being controlled to be a lower level than said first one of said levels.

3. A method of forming battery plates according to claim 2, wherein:
   said step of controlling said source of electrical current includes the step of controlling said current to provide eight discrete sequential predetermined constant-current levels, a second one of said sequential predetermined constant-current levels being controlled to be a higher level than a first one of said levels, a third one of said levels being controlled to be a higher level than said second one of said levels, a fourth one of said levels being controlled to be a higher level than said third one of said levels, and a fifth one of said sequential predetermined constant-current levels being controlled to be a lower level than the level of said fourth level, and a sixth one of said levels being controlled to be a lower level than the level of said fifth level, and a seventh one of said levels being controlled to be a lower level than the level of said seventh level, and an eighth of said levels being controlled to be a lower level than the level of said seventh of said sequential predetermined constant-current levels, and being controlled to be a lower level than said first one of said levels.

4. Apparatus for controlling electrical current for forming battery electrodes, comprising:
   input means for receiving a predetermined manual input of total desired forming current ampere hours;
   current step calculator means operably connected to said input means for calculating a plurality of sequential forming current steps as predetermined percentages of said total desired forming current ampere hours at predetermined forming current levels;
   power supply means for supplying said forming current;
   current control means for stepwise controlling the current provided by said current control means;
   current integrator means for measuring and integrating the current supplied to said battery electrodes by said power supply means, and for providing an output signal upon measuring a predetermined number of ampere hours;
   stepper control means operably connected to said calculator means for controlling stepper means, said stepper means being operably connected to said current control means for stepwise adjusting said current control means;
   said current integrator means providing a signal to said stepper control means for selecting a succeeding said sequential forming current step when said current integrator means provides said output signal.

* * * * *